(12) United States Patent
Anderson et al.

(10) Patent No.: US 12,119,505 B2
(45) Date of Patent: Oct. 15, 2024

(54) MULTI-PURPOSE BATTERY PACK

(71) Applicant: BRIGHTZ, LTD., Ottawa Lake, MI (US)

(72) Inventors: Brent C. Anderson, Ottawa Lake, MI (US); Ronald V. Finch, Ottawa Lake, MI (US); Brian V. Finch, Ottawa Lake, MI (US)

(73) Assignee: BRIGHTZ, LTD., Ottawa Lake, MI (US)

( * ) Notice: Subject to any disclaimer, the term of this patent is extended or adjusted under 35 U.S.C. 154(b) by 559 days.

(21) Appl. No.: 16/947,349

(22) Filed: Jul. 29, 2020

(65) Prior Publication Data

US 2021/0036275 A1 Feb. 4, 2021

Related U.S. Application Data

(60) Provisional application No. 62/879,563, filed on Jul. 29, 2019.

(51) Int. Cl.
*H01M 50/20* (2021.01)
*F21S 4/00* (2016.01)
*F21V 23/02* (2006.01)
*F21Y 115/10* (2016.01)
*H01M 50/256* (2021.01)

(52) U.S. Cl.
CPC .............. *H01M 50/20* (2021.01); *F21S 4/00* (2013.01); *F21V 23/023* (2013.01); *H01M 50/256* (2021.01); *F21Y 2115/10* (2016.08); *H01M 2220/30* (2013.01)

(58) Field of Classification Search
CPC .............. H01M 50/20; H01M 50/256; H01M 2220/30; F21S 4/00; F21V 23/023; F21Y 2115/10
See application file for complete search history.

(56) References Cited

U.S. PATENT DOCUMENTS

| 1,685,573 | A | 9/1928 | Peter |
| 4,834,122 | A | 5/1989 | Yuhara et al. |
| 5,577,779 | A | 11/1996 | Dangel |
| 5,797,488 | A | 8/1998 | Yemini |

(Continued)

FOREIGN PATENT DOCUMENTS

| CN | 102773851 A | 11/2012 |
| CN | 103228550 A | 7/2013 |

(Continued)

*Primary Examiner* — Brian R Ohara
*Assistant Examiner* — Patrick Marshall Greene
(74) *Attorney, Agent, or Firm* — Vorys, Sater, Seymour and Pease LLP; Rex W. Miller, II

(57) ABSTRACT

A portable power device may comprise a housing configured to contain an internal power supply and an attachment strap releasably connected to the housing for securing the device to an object or with space. The housing may comprise a top portion connected to a bottom portion by at least one hinge, and a gasket may be disposed between the top portion and the bottom portion to inhibit moisture from entering the housing. At least one clasp may be disposed on a side of the housing opposite the at least one hinge, the at least one clasp being configured to maintain the housing in a closed position without the use of tools. An attachment bracket may be provided that is releasably connected to the housing.

11 Claims, 14 Drawing Sheets

(56) References Cited

U.S. PATENT DOCUMENTS

| | | |
|---|---|---|
| D424,406 S | 5/2000 | Frey |
| 6,076,865 A | 6/2000 | Sokurenko et al. |
| 6,082,539 A | 7/2000 | Lee |
| 6,136,467 A | 10/2000 | Phelps et al. |
| 6,164,484 A | 12/2000 | Fiore et al. |
| 6,164,505 A | 12/2000 | Holter |
| 6,173,837 B1 | 1/2001 | Marconi |
| 6,227,581 B1 | 5/2001 | Lambert |
| 6,244,066 B1 | 6/2001 | LaRose |
| 6,354,308 B1 | 3/2002 | Kuk |
| 6,454,064 B1 | 9/2002 | Cheng |
| 6,527,309 B1 | 3/2003 | Gaydos et al. |
| 6,547,293 B1 | 4/2003 | Cheng |
| 6,612,435 B1 | 9/2003 | Chang |
| 6,685,023 B2 | 2/2004 | Bleggi et al. |
| 6,691,843 B2 | 2/2004 | Nykoluk et al. |
| D492,184 S | 6/2004 | Parker et al. |
| 6,789,692 B2 | 9/2004 | Prezelin |
| 6,942,257 B2 | 9/2005 | Wong et al. |
| 6,955,381 B2 | 10/2005 | Parker et al. |
| 7,059,472 B2 | 6/2006 | Lai |
| 7,258,230 B2 | 8/2007 | Hernandez et al. |
| 7,401,698 B2 | 7/2008 | Dost et al. |
| 7,464,820 B2 | 12/2008 | Oh |
| 7,497,487 B2 | 3/2009 | Burmahln |
| 7,516,842 B2 | 4/2009 | Gu |
| 7,540,364 B2 | 6/2009 | Sanderson |
| 7,568,739 B2 | 8/2009 | Lee |
| 7,573,385 B2 | 8/2009 | Tonelli |
| D600,912 S | 9/2009 | Brunner |
| 7,610,782 B2 | 11/2009 | Lax et al. |
| D621,353 S | 8/2010 | Mack |
| 7,837,053 B2 | 11/2010 | Arnett et al. |
| 7,963,131 B2 | 6/2011 | Zhang et al. |
| 8,079,467 B2 | 12/2011 | Barnette et al. |
| 8,149,571 B2 | 4/2012 | Yang et al. |
| 8,199,466 B2 | 6/2012 | Shen et al. |
| 8,252,454 B2 | 8/2012 | Jiang |
| 8,257,859 B2 | 9/2012 | Xie et al. |
| 8,261,933 B2 | 9/2012 | Kidd et al. |
| 8,293,394 B2 | 10/2012 | Zhou |
| 8,297,464 B2 | 10/2012 | Grenier et al. |
| 8,328,247 B2 | 12/2012 | Tonelli |
| 8,567,828 B2 | 10/2013 | Andrén et al. |
| 8,596,485 B2 | 12/2013 | Lindsay |
| 8,646,600 B2 | 2/2014 | Amatrudo |
| D707,100 S | 6/2014 | Kinskey et al. |
| 8,770,426 B2 | 7/2014 | Arnett et al. |
| 8,899,416 B2 | 12/2014 | McDonnough et al. |
| 8,944,476 B1 | 2/2015 | Henderson |
| 9,027,751 B2 | 5/2015 | Lee |
| 9,085,403 B2 | 7/2015 | Roach et al. |
| 9,193,060 B2 | 11/2015 | Ben-Gigi |
| 9,193,061 B1 | 11/2015 | Lin |
| 9,248,566 B2 | 2/2016 | Horiyama et al. |
| D759,590 S | 6/2016 | Wang |
| 9,492,918 B2 | 11/2016 | Lu |
| 9,509,089 B2 | 11/2016 | Mathews et al. |
| D777,104 S | 1/2017 | Liu et al. |
| D778,707 S | 2/2017 | Tonelli |
| 9,770,081 B2 | 9/2017 | Chao |
| 9,821,956 B2 | 11/2017 | Wright |
| 9,893,330 B2 | 2/2018 | Lam |
| D815,831 S | 4/2018 | Tonelli |
| D821,968 S | 7/2018 | Zhao |
| 10,027,188 B2 | 7/2018 | Rejman |
| D825,464 S | 8/2018 | Xie |
| D825,465 S | 8/2018 | Deng |
| D826,027 S | 8/2018 | Carey et al. |
| D828,028 S | 9/2018 | Seiders et al. |
| D828,029 S | 9/2018 | Seiders et al. |
| D840,150 S | 2/2019 | Seiders et al. |
| D853,320 S | 7/2019 | Guo |
| 10,392,175 B2 | 8/2019 | Kinskey |
| 10,405,626 B2 | 9/2019 | Gonitianer et al. |
| D861,605 S | 10/2019 | Yang |
| D861,606 S | 10/2019 | Yang |
| D869,160 S | 12/2019 | Seiders et al. |
| D872,478 S | 1/2020 | Seiders et al. |
| D872,485 S | 1/2020 | Seiders et al. |
| D873,020 S | 1/2020 | Seiders et al. |
| D881,812 S | 4/2020 | Yang |
| 10,609,995 B2 | 4/2020 | Chan et al. |
| 10,624,430 B1 | 4/2020 | Godwin et al. |
| 10,625,910 B2 | 4/2020 | Hu et al. |
| D885,326 S | 5/2020 | Zhang et al. |
| D886,045 S | 6/2020 | Deng |
| D886,738 S | 6/2020 | Huang |
| 10,722,012 B2 | 7/2020 | Kraus et al. |
| D896,179 S | 9/2020 | Yang |
| 10,760,312 B2 | 9/2020 | Butler et al. |
| 10,766,671 B2 | 9/2020 | Mooney et al. |
| 10,797,743 B1 | 10/2020 | Sessions |
| 10,858,160 B2 | 12/2020 | Yang |
| D911,930 S | 3/2021 | Xie |
| D912,616 S | 3/2021 | He |
| 11,019,899 B2 | 6/2021 | Bhatnagar et al. |
| D929,333 S | 8/2021 | Benjakachorndech et al. |
| D933,590 S | 10/2021 | Wu et al. |
| D946,894 S | 3/2022 | Seiders et al. |
| D956,006 S | 6/2022 | Mattila et al. |
| D962,010 S | 8/2022 | Nichols et al. |
| 11,427,383 B2 | 8/2022 | Mattila et al. |
| D965,409 S | 10/2022 | Bullock et al. |
| 11,465,807 B2 | 10/2022 | Morisey |
| 11,498,727 B2 | 11/2022 | Guerdrum et al. |
| 11,502,358 B1 | 11/2022 | Benjakachorndech et al. |
| 11,510,660 B2 | 11/2022 | Goeckner et al. |
| D971,843 S | 12/2022 | Li |
| 11,700,700 B2 | 7/2023 | Chen et al. |
| 2004/0178202 A1 | 9/2004 | Serio |
| 2004/0188294 A1 | 9/2004 | Chen |
| 2006/0017293 A1 | 1/2006 | Tonelli |
| 2006/0108979 A1* | 5/2006 | Daniel ............ H01M 10/4257 320/112 |
| 2006/0158890 A1* | 7/2006 | Freedman ............... B62J 11/19 362/390 |
| 2006/0208453 A1* | 9/2006 | Ishikawa ................ B62M 6/90 429/100 |
| 2008/0067091 A1 | 3/2008 | Chang |
| 2008/0115607 A1 | 5/2008 | Chang et al. |
| 2008/0116696 A1 | 5/2008 | Schmitt et al. |
| 2008/0203106 A1 | 8/2008 | Uytterhaeghe et al. |
| 2008/0308568 A1 | 12/2008 | Grenier et al. |
| 2009/0114646 A1 | 5/2009 | Whalen |
| 2009/0123818 A1* | 5/2009 | Huang ............... H01M 50/213 429/98 |
| 2010/0050363 A1 | 3/2010 | Young |
| 2010/0095488 A1 | 4/2010 | Chang |
| 2010/0104931 A1 | 4/2010 | Zuo et al. |
| 2010/0187836 A1 | 7/2010 | Mason |
| 2010/0209754 A1 | 8/2010 | Zuo |
| 2010/0279164 A1 | 11/2010 | Gao |
| 2011/0020684 A1 | 1/2011 | Liang et al. |
| 2011/0084078 A1 | 4/2011 | Twig et al. |
| 2011/0132046 A1 | 6/2011 | Tonelli |
| 2011/0135983 A1 | 6/2011 | Liang |
| 2011/0147386 A1 | 6/2011 | Whalen |
| 2011/0290801 A1 | 12/2011 | Liu |
| 2011/0318622 A1 | 12/2011 | Hsiung |
| 2012/0067914 A1 | 3/2012 | Sadler et al. |
| 2012/0243245 A1* | 9/2012 | Smith .................. B60Q 1/2696 29/428 |
| 2013/0127183 A1 | 5/2013 | Chang |
| 2013/0321990 A1 | 12/2013 | Chung et al. |
| 2015/0129569 A1 | 5/2015 | Miller |
| 2015/0190919 A1 | 7/2015 | Chang |
| 2015/0209226 A1 | 7/2015 | Priebe et al. |
| 2015/0315532 A1 | 11/2015 | Bergbohm et al. |
| 2017/0086550 A1 | 3/2017 | Caro |
| 2018/0334297 A1 | 11/2018 | De Wilde et al. |
| 2019/0047753 A1 | 2/2019 | Koo |
| 2019/0271433 A1 | 9/2019 | Tonelli |
| 2019/0372071 A1* | 12/2019 | An ..................... H01M 50/271 |

(56) References Cited

U.S. PATENT DOCUMENTS

| | | |
|---|---|---|
| 2020/0011086 A1 | 1/2020 | Lai et al. |
| 2020/0215680 A1 | 7/2020 | Meixner et al. |
| 2020/0307879 A1 | 10/2020 | Karlsson |
| 2021/0102409 A1 | 4/2021 | Seiders et al. |
| 2021/0204663 A1 | 7/2021 | Nichols et al. |
| 2021/0245065 A1 | 8/2021 | Reichert et al. |
| 2021/0253310 A1 | 8/2021 | Wong et al. |
| 2021/0321736 A1 | 10/2021 | Tonelli |
| 2022/0081935 A1 | 3/2022 | Thompson |
| 2022/0410364 A1 | 12/2022 | Karlsson et al. |

FOREIGN PATENT DOCUMENTS

| | | |
|---|---|---|
| CN | 102131994 B | 8/2013 |
| CN | 203521498 U | 4/2014 |
| CN | 105492334 A | 4/2016 |
| DE | 202004014409 U1 | 11/2004 |
| FR | 2917720 B1 | 12/2008 |
| GB | 218308 A | 10/1924 |
| KR | 101161651 B1 | 7/2012 |
| KR | 101474279 B1 | 12/2014 |
| NZ | 561066 A | 7/2009 |
| WO | 2020056189 A1 | 3/2020 |

\* cited by examiner

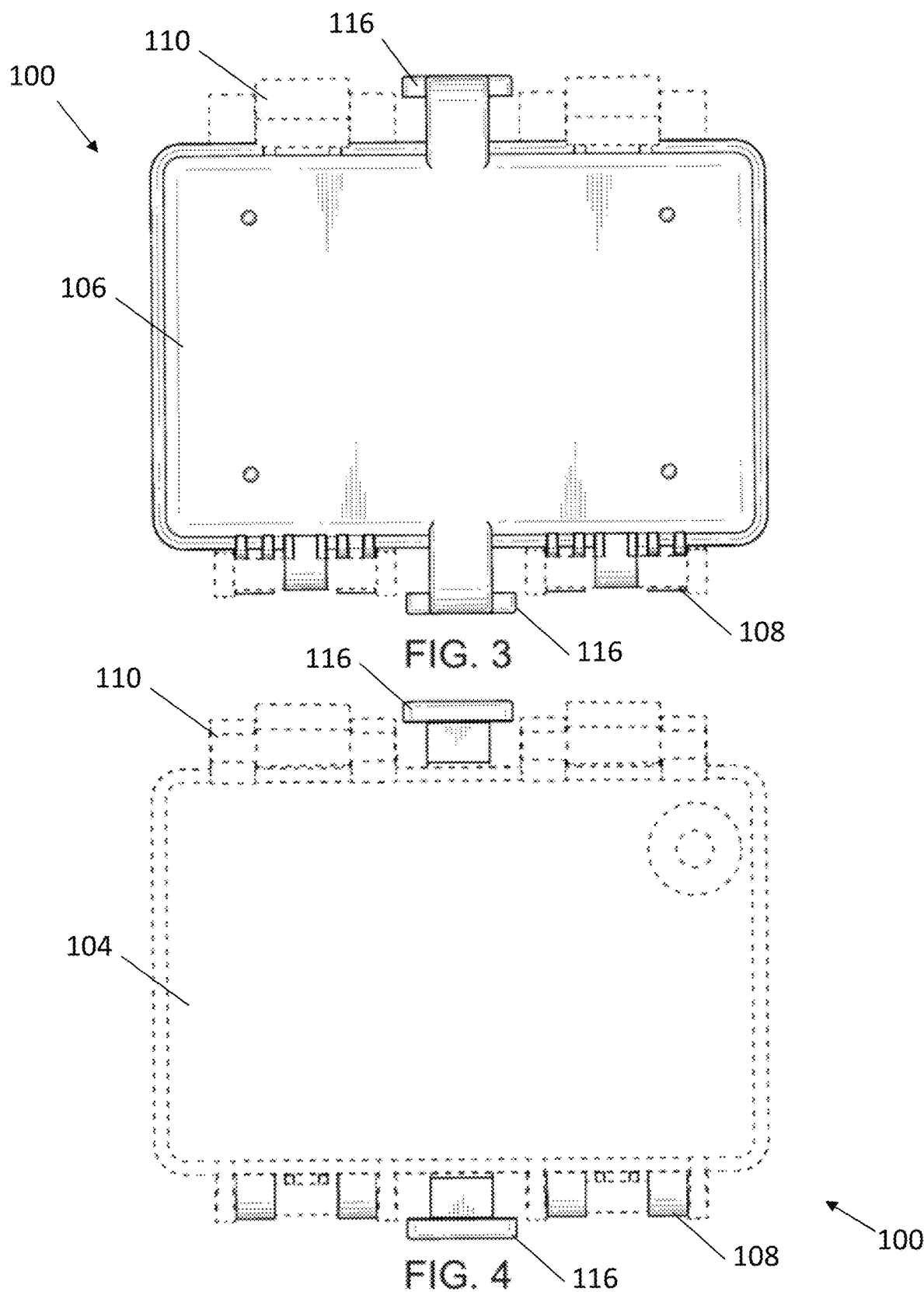

MULTI-PURPOSE BATTERY PACK

CROSS-REFERENCE TO RELATED APPLICATIONS

This application claims priority to and the benefit of U.S. Provisional Patent Application No. 62/879,563 filed on Jul. 29, 2019, which is incorporated herein in its entirety.

BACKGROUND OF THE INVENTION

The present disclosure relates to portable power devices, and more specifically portable battery packs configured for multiple applications.

Many products, and especially many consumer products, use battery packs to provide portable power. As one example, illumination devices have been developed for various applications including illuminating portions of bicycles, game boards (such as basketball hoop stands), and tents or canopies. Such devices require a source of power and have typically relied upon battery packs. To minimize cost, many of these prior designs require tools to open and close the packs. For example, battery packs frequently use screws to attach a cover over the batteries requiring a screw driver to change the batteries. Other designs utilizing a sliding cover, such as is common on remote controls, are often not watertight and poorly suited to applications where the battery pack is subjected to significant movement such as on bicycle or game structure. Accordingly, there remains a need for battery packs, and more generally portable power devices, that are can support multiple applications while remaining easy to use.

SUMMARY OF THE INVENTION

Presently disclosed is a portable power device that includes a housing configured to contain an internal power supply, the housing having a top portion connected to a bottom portion by at least one hinge; a gasket disposed between the top portion and the bottom portion to inhibit moisture from entering the housing; at least one clasp disposed on a side of the housing opposite the at least one hinge, the at least one clasp configured to maintain the housing in a closed position without the use of tools; an attachment strap releasably connected to the housing; and an attachment bracket releasably connected to the housing.

Also disclosed is a portable power device that includes an internal power supply connector configured to receive power from an internal power supply; an external power supply connector configured to receive power from an external power supply; an output configured to receive power from either the internal power supply or the external power supply.

Also disclosed herein is a method for a portable power device. The method may comprise positioning a housing of the device at a location proximate to an object to which the device is to be secured; wrapping a strap around the object; connecting the strap to the housing to thereby mount the device to the object; and accessing an interior compartment of the housing when mounted to the object. In some embodiments, at least one strap anchor is attached to the housing, and the step of connecting the strap to the housing includes connecting the attachment strap to the strap anchors. In some embodiments, the step of accessing an interior compartment of the housing includes unlatching a first portion of the housing from a second portion of the housing when mounted to the object. In some embodiments, the method may further comprise installing an internal power supply within the interior compartment of the housing when mounted to the object.

BRIEF DESCRIPTION OF THE FIGURES

The invention can be best understood from the following detailed description of exemplary embodiments of the invention taken in conjunction with the accompanying drawings.

FIGS. 1-8 illustrate an example embodiment of a portable power device according to the present disclosure.

DETAILED DESCRIPTION

Embodiments of the subject matter presently disclosed relate to a portable power device. The disclosed subject matter further relates to a portable power device that is adaptable for use in a wide variety of applications. The portable power device may also be configured to selectively use an internal power source or an external power source, further increasing the utility of the device.

Figure 1:
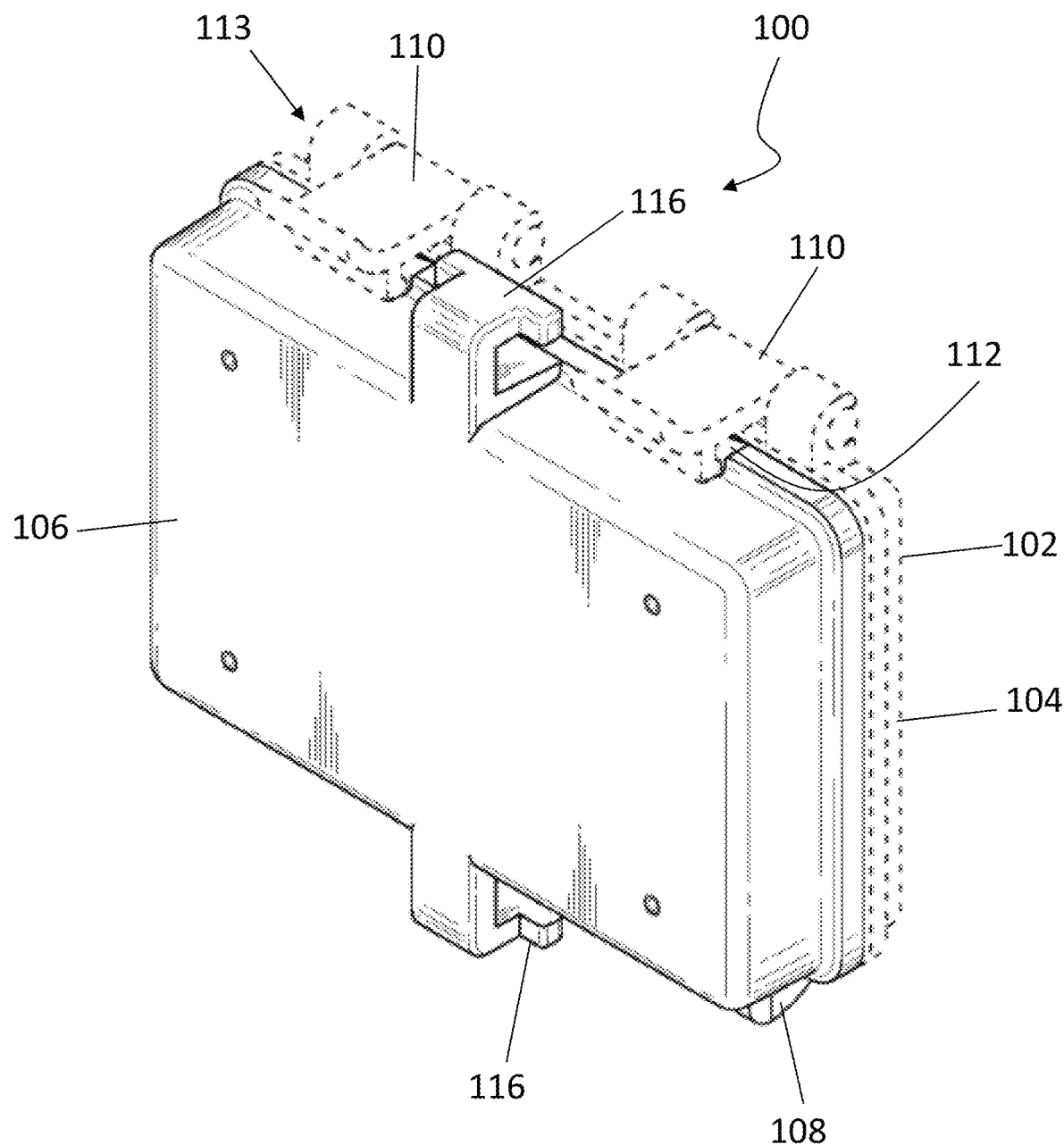
Figure 2:
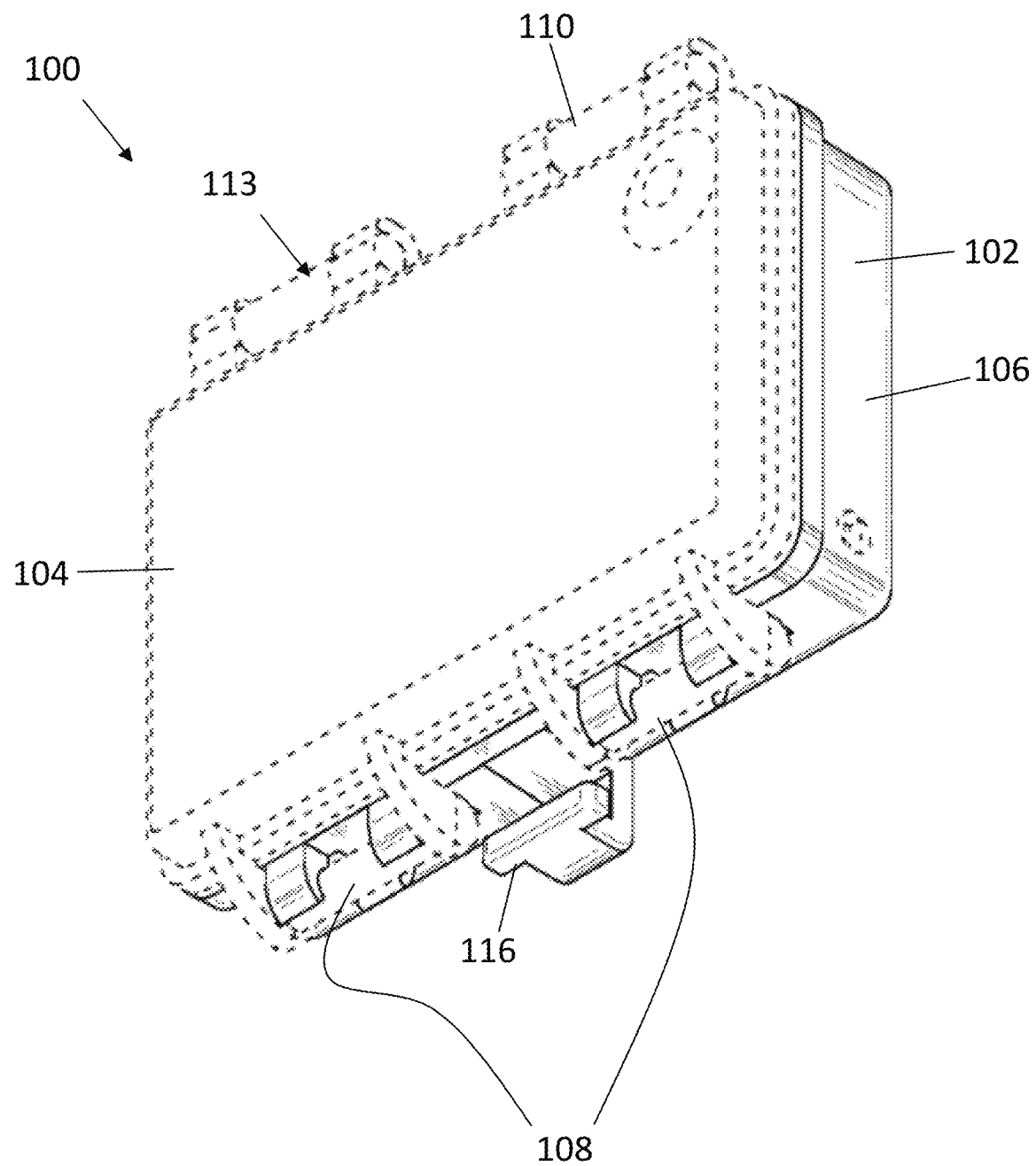
Figure 5:
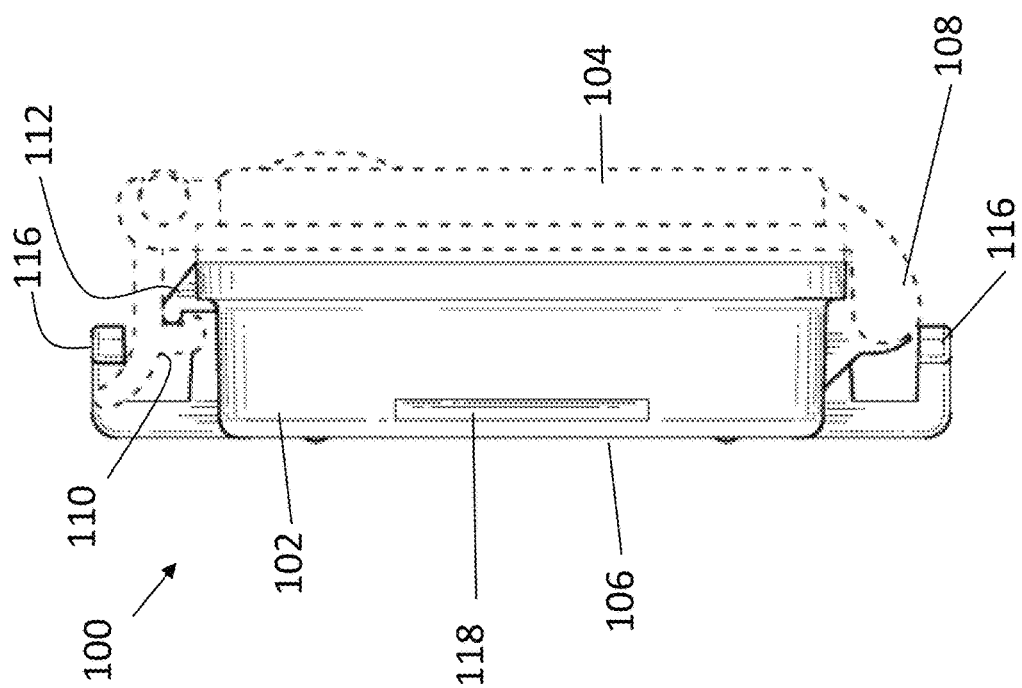
Figure 6:
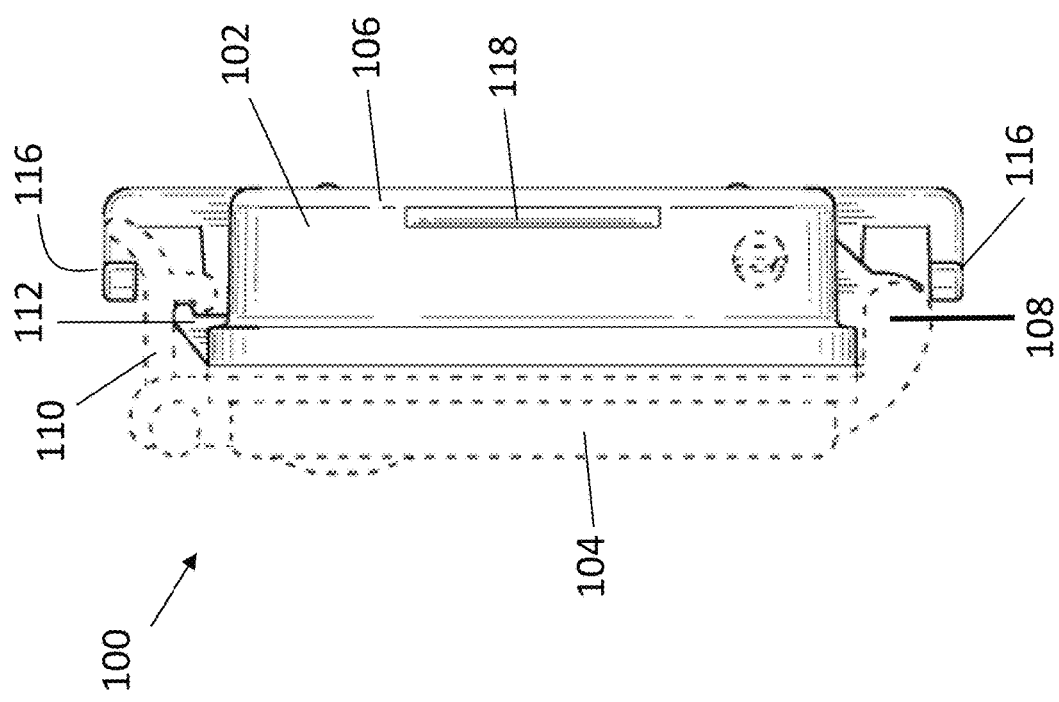
Figure 7:
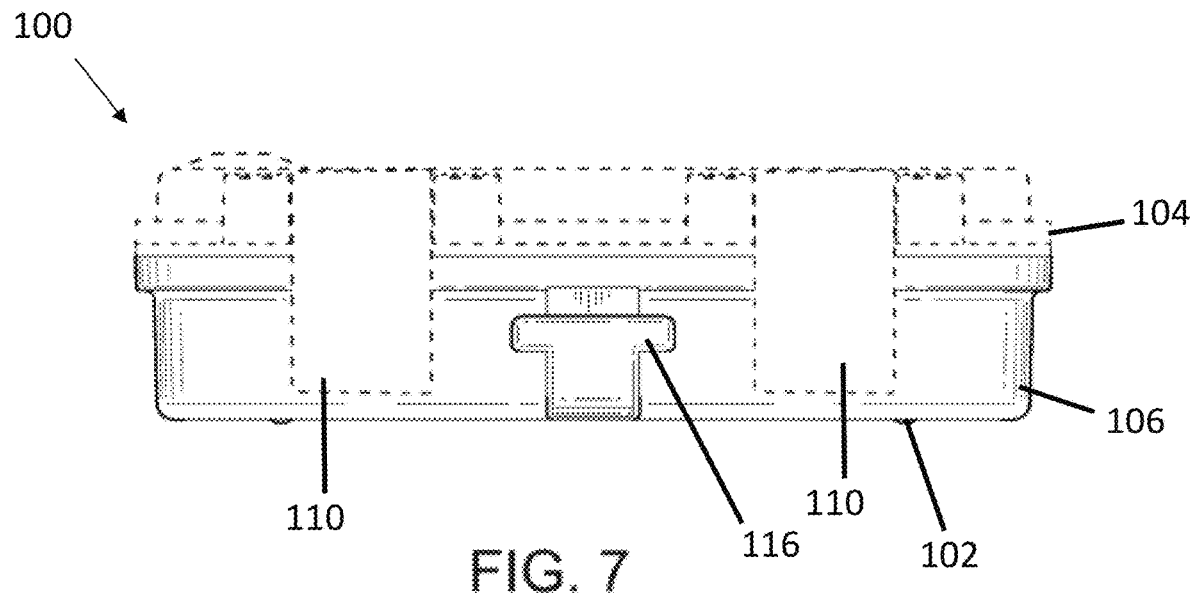
Figure 8:
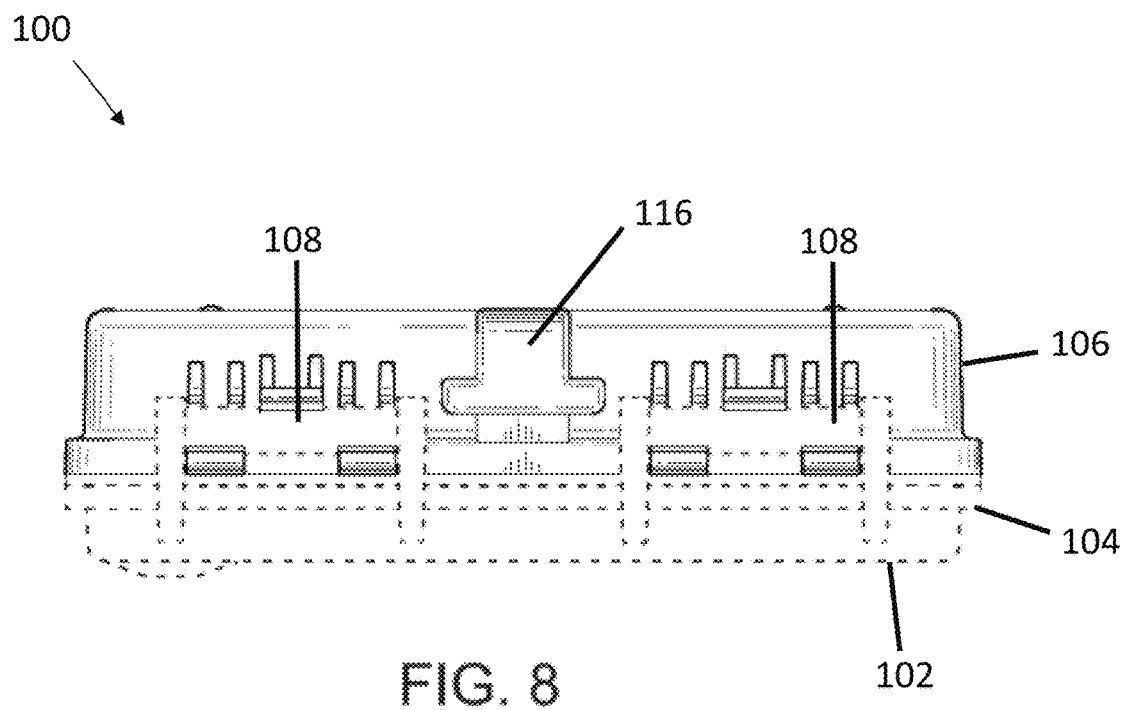

Referring generally to FIGS. 1-8, an example embodiment of a portable power device 100. In one embodiment, the device 100 includes a housing 102 having a top portion 104 and a bottom portion 106. The top portion and bottom portion 104, 106 may be connected by one or more hinges 108 (see FIG. 2), the components of which may be integrally formed with the top portion and bottom portion 104, 106 respectively. The top portion and bottom portion 104, 106 may be secured in a closed position (as exemplified in FIGS. 1-8) by one or more clasps 110. Each clasp 110 may have a generally T-shaped configuration, such that the clasp 110 may be rotatably secured to the top portion 104, for example, via a hinge joint 113, and may engage a catch 112 on the bottom portion 106 of the housing 102. As shown in FIGS. 1 and 2, the clasps 110 are positioned opposite the hinges 108, however other configurations are also contemplated. The housing 102 may include a mounting surface that abuts the object to which the device 100 is releasably secured to the object, and the mounting surface of the housing 102 may have a geometry that corresponds with the geometry of the object on which it is mounted. For example, an exterior surface of the second portion 106 may have a curvature that corresponds to the curvature of a tube of a bicycle frame.

Figure 9:
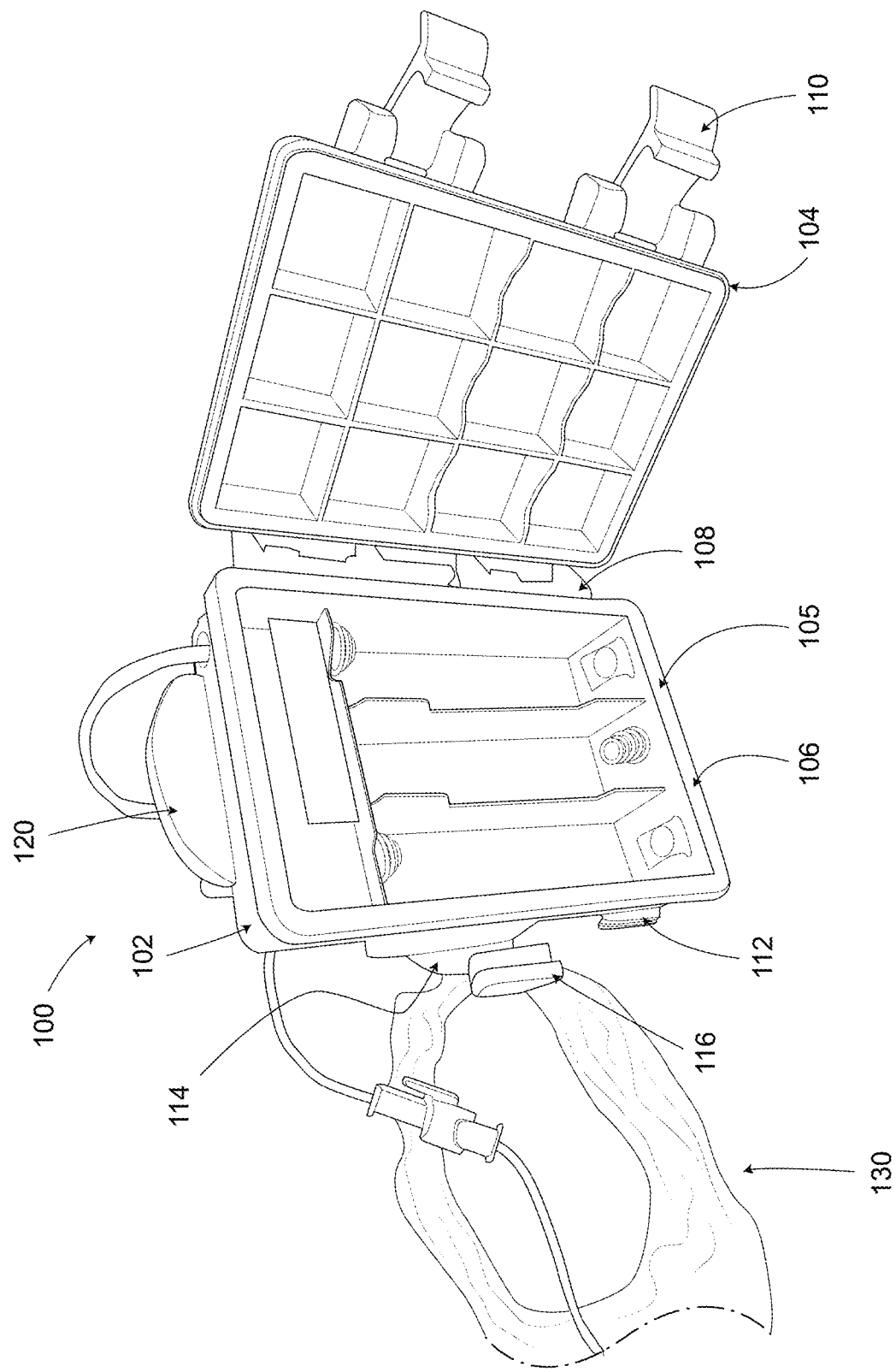
FIGS. 9-13 illustrate another example embodiment of a portable power device according to the present disclosure.
Figure 10:
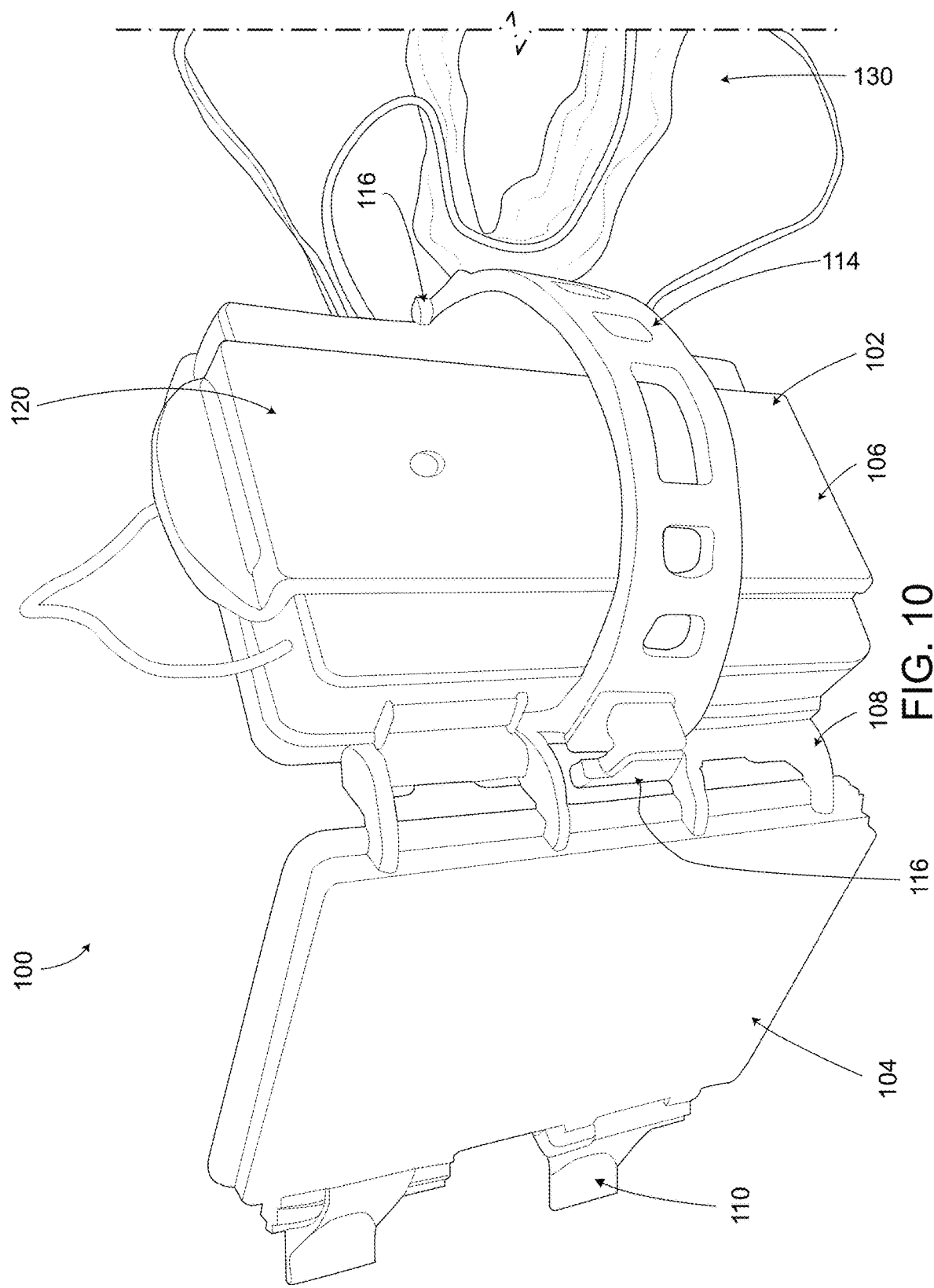
Figure 11:
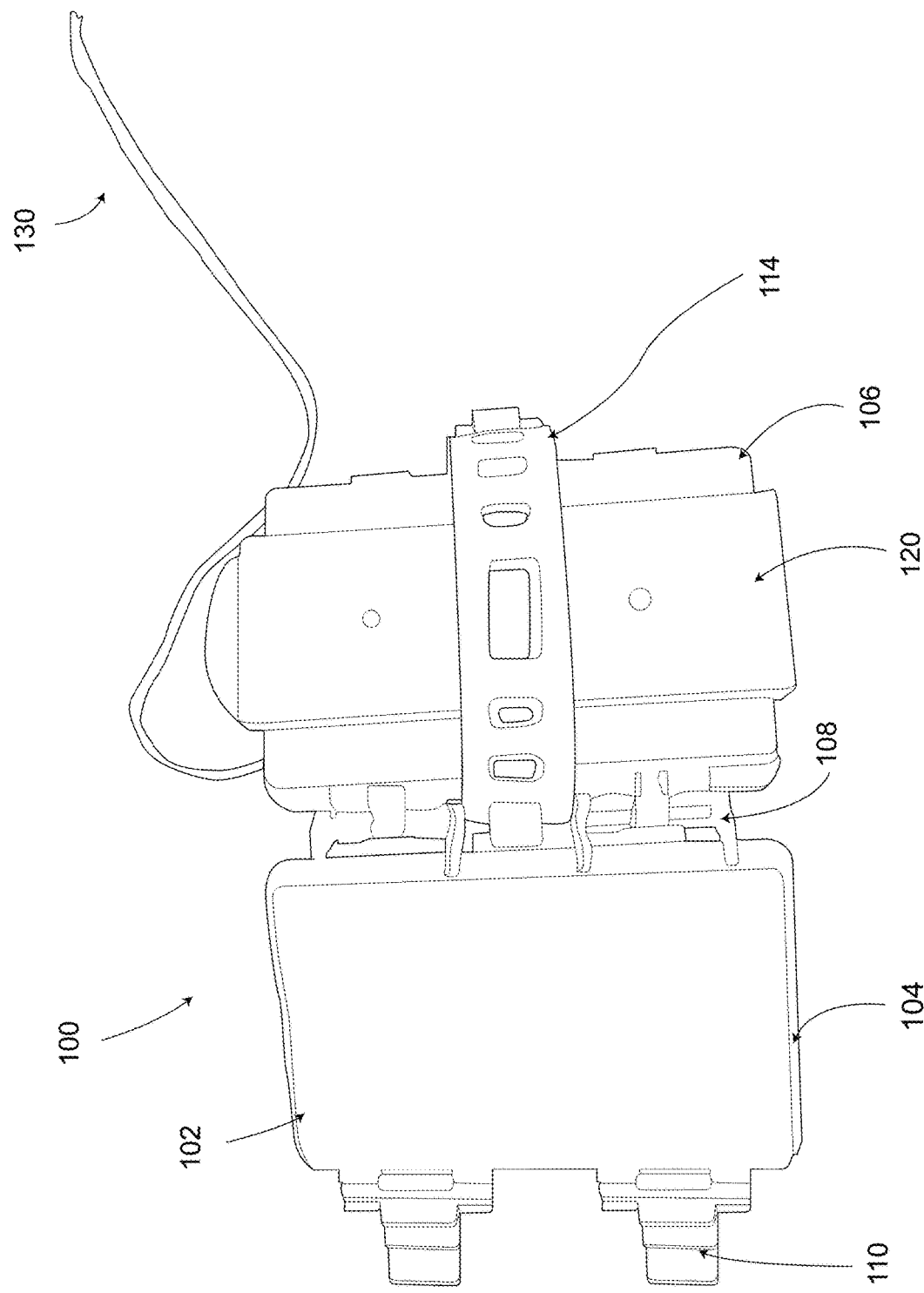
Figure 12:
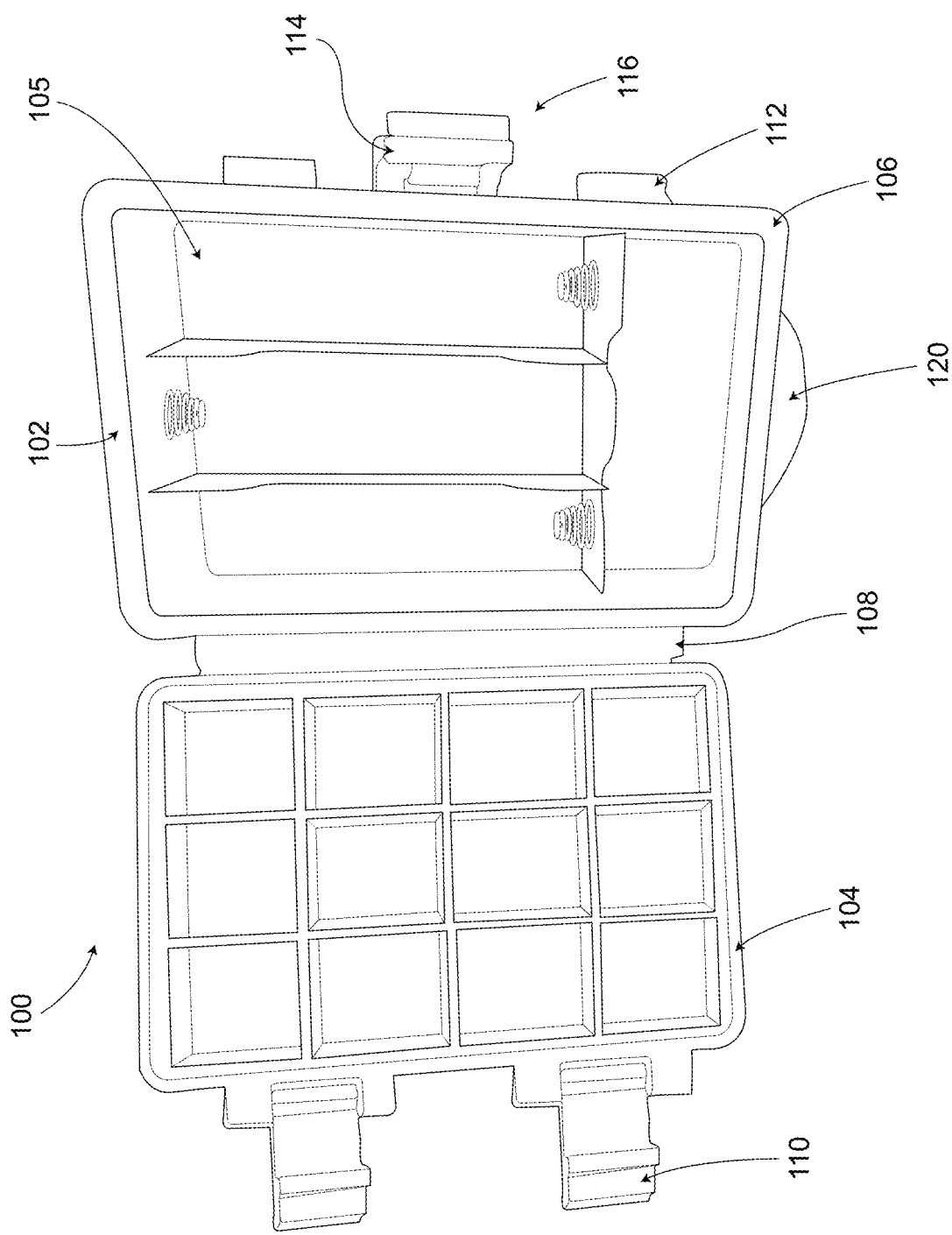
Figure 13:
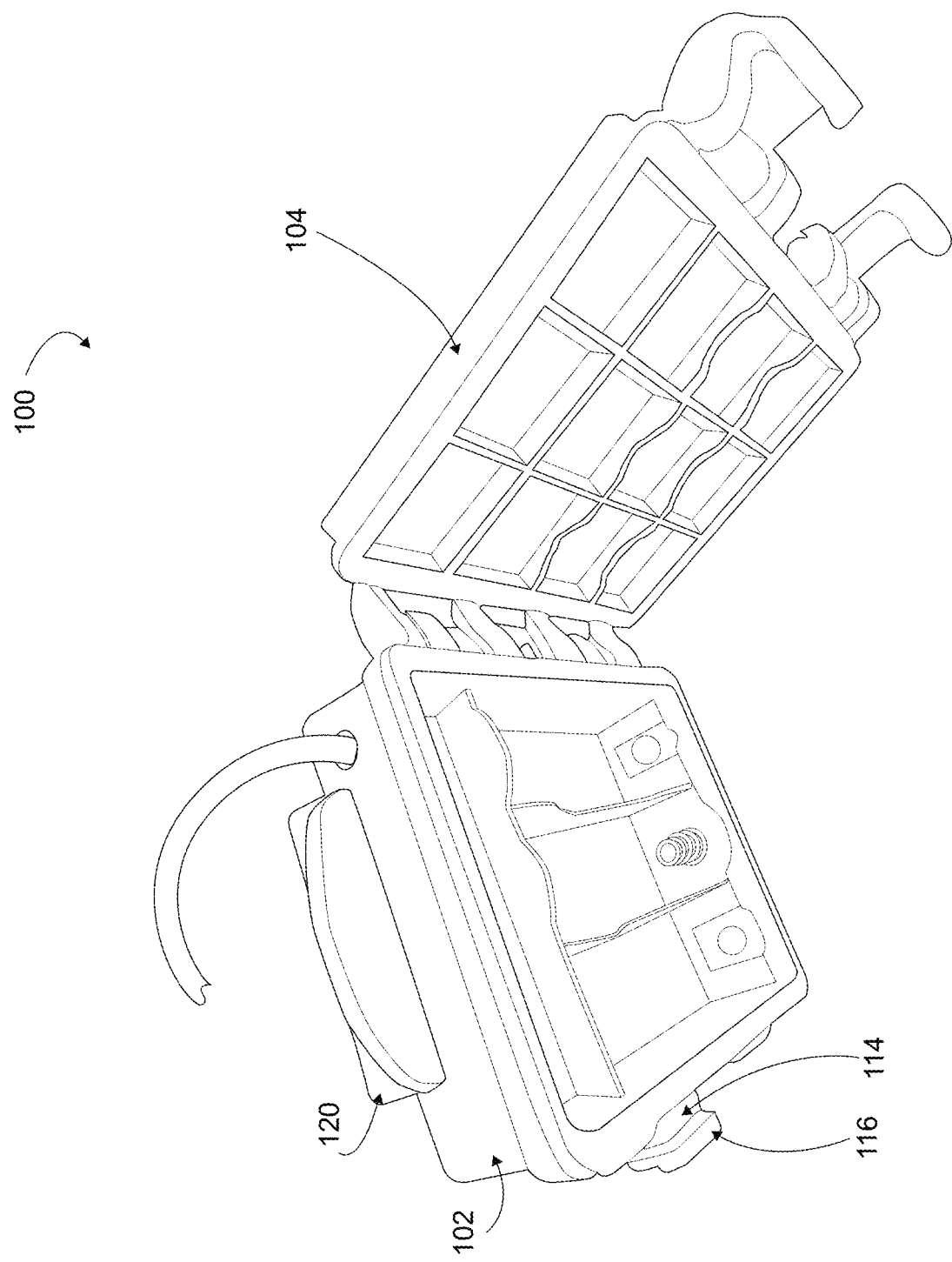

The housing 100 further includes a gasket (shown in FIGS. 9, 12 and 13). The gasket is disposed between the top portion 104 and the bottom portion 106 of the housing 102 and configured to inhibit moisture from entering the housing 102. The gasket may be formed of an elastic material, such as rubber, such that the gasket is compressed when the housing 102 is secured in a closed position with the clasps 110. In this manner, the housing 102 may be deemed watertight or water resistant.

The housing 102 is configured to contain an internal power supply. The internal power supply may include one or more batteries. Thus, the housing 102 may include an interior compartment 105 configured to operatively receive and retain one or more batteries. The interior compartment 105 may be accessible by opening the housing 102, for example, by moving (e.g., rotating) the first and second portions 104, 106 relative to each other to thereby expose the interior compartment 105, and then installing or operatively placing the one or more batteries within the interior compartment 105 defined within the housing 102. The batteries may be rechargeable or non-rechargeable, or combinations of the same. In some embodiments, the internal power supply may also (or instead) include a regenerative power source for directly powering and/or recharging the battery, such as, for example, a photovoltaic cell, a mechanical generator, etc. In some examples, the mechanical generator may be configured as a bicycle generator having a roller contacting a rotating portion of the bicycle (e.g., tire, hub, etc.) and/or having magnets connected to the rotating portion of the bicycle, wherein the bicycle generator generates electricity as the rotating portion of the bicycle rotates. In some embodiments, the housing 102 also includes an opening for an external power supply connector, such as a USB or micro USB connector. The portable power device may also include a circuit (for example, as described below with reference to FIG. 15) that automatically switches between the internal power supply and an external power supply depending upon whether an external power supply is connected.

Figure 14A:
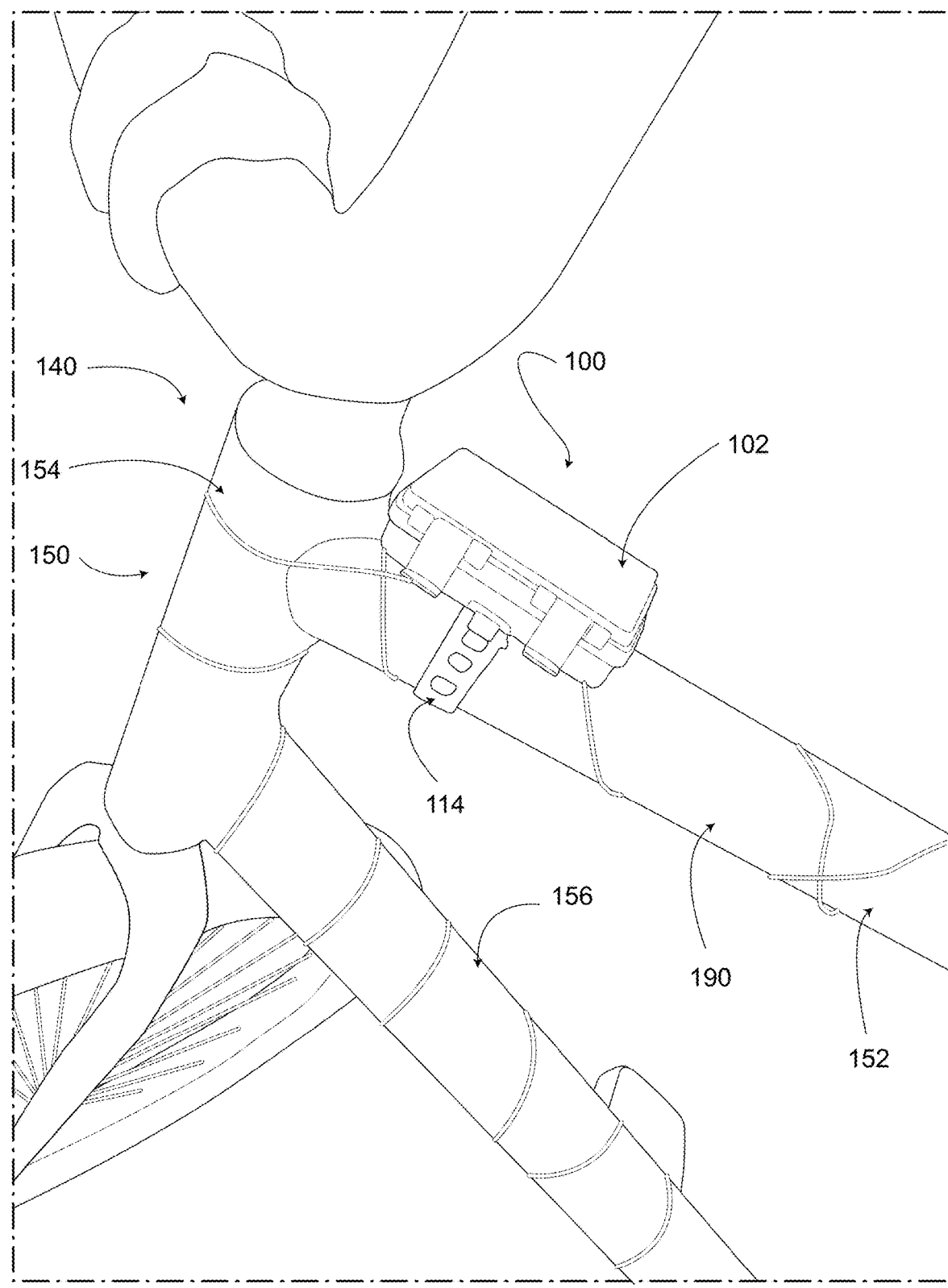
FIGS. 14A-14D illustrate different exemplary methods of mounting the device according to various embodiments of the present disclosure.

The portable power device 100 as disclosed herein may be used in a wide variety of applications. The device 100 may include an attachment strap 114. Referring to FIGS. 9-14, the attachment strap 114 may be releasably connected to the housing 102. The attachment strap 114 may be formed of rubber or similar elastic material. The attachment strap 114 may be used to secure the device 100 to an object, such as a post, bicycle frame, etc. For example, the attachment strap 114 may secure the device 100 to a seat post, seat tube, down tube, top tube, fork, etc., of a bicycle frame. In other embodiments, the attachment strap 114 may secure the device 100 to the spokes of a bicycle by wrapping around two or more spokes of a bicycle wheel. For example, where the bicycle wheel includes spokes arranged in a crossed lacing pattern (e.g., two-cross pattern, three-cross spoke pattern, four-cross pattern, etc.), a first plurality of spokes that each extend tangentially from a first end of the hub towards a rim, with each such spoke crossing (at least) another one of the first plurality of spokes at a spoke crossing corresponding with the first hub end, and a second plurality of spokes that each extend tangentially from a second end of the hub towards the rim, with each such spoke crossing (at least) another one of the second plurality of spokes at a spoke crossing corresponding with the second hub end. In this example, a lateral space is defined between the first and second plurality of spokes, with such lateral spacing extending in a direction that corresponds with a lateral dimension of the hub as measured between the first and second ends thereof. In this manner, each spoke crossing of the first plurality of spokes is laterally spaced from a corresponding spoke crossing of the second plurality of spokes, and the attachment strap 114 may secure the device 100 in the lateral space defined between the first and second plurality of spokes of the bicycle by wrapping the attachment strap 114 around the spoke crossing of the first plurality of spokes and the corresponding spoke crossing of the second plurality of spokes. In other examples, the attachment strap 114 may secure the device 100 in the lateral space defined between the first and second plurality of spokes of the bicycle by wrapping the attachment strap 114 around one or more spoke crossing of just the first plurality of spokes or around one or more spoke crossing of just the second plurality of spokes, rather than between oppositely disposed (laterally spaced) spoke crossings of the first and second plurality of spokes. For example, as illustrated in FIG. 14A, the first plurality of spokes of the bicycle may include at least a pair of adjacent spoke crossings that are laterally spaced (in a direction corresponding with the hub length) from the second plurality if spokes, and the attachment strap 114 may be by wrapped (extended) around the pair of adjacent spoke crossings of the first plurality of spokes, thereby securing the device 100 to the first plurality of spokes in the lateral space defined between the first and second plurality of spokes of the bicycle. Thus, the device 100 may be secured to either or both of the first plurality of spokes and/or the second plurality of spokes. The elastic nature of the attachment strap 114 may provide a form of shock absorption to reduce vibration or impacts to the device 100 that may be experienced in certain applications, for example, when mounted within the spokes of the bicycle wheel and/or on the frame of the bicycle.

The housing 102 may include one or more strap anchors 116 (shown for example in FIG. 1). The attachment strap 114 may be connected to the housing 102 using the strap anchors 116. The attachment strap 114 may have multiple openings used to secure the attachment strap 114 around objects of different sizes. In the illustrated example, the attachment anchors 116 are T-shaped protrusions that are positionable through the openings in the attachment strap 114 to fasten the attachment strap 114 relative to the housing 102. In other embodiments, the attachment strap 114 may be secured with a clasp or an adjustable attachment means. The strap anchors 116 may be provided at various locations at and about the housing 102. In the illustrated example, the strap anchors 116 are provided on the second portion 106 of the housing 102; however, in other examples, one or more of the strap anchors 116 may be provided on the first portion 104 of the housing 102. In some examples, the strap anchors 116 are provided on both the first and second portion 104, 106 of the housing 102. In the illustrated example, the housing 102 includes two of the strap anchors 116; however, in other examples, more or less than two of the strap anchors 116 may be provided. Also in the illustrated examples, the strap anchors 116 are integral with the housing 102; however, in other examples, one or more of the strap anchors 116 may be differently provided on the housing 102. The strap anchors 116 may have various confT-shaped configuration The interior compartment 105 of the housing 102 may be accessed (e.g., for installing or replacing the one or more batteries) when the attachment strap 114 is securing the device 100 secured to an object, such as a post, bicycle frame, etc. In this manner, a user may utilize the device 100 by releasably attaching it to an object via the attachment strap 114 (i.e., by wrapping the attachment strap 114 around the object), accessing the interior compartment 105 of the housing 102 secured to the object by opening the housing 102 (e.g., by moving or rotating the first and second portions 104, 106 relative to each other), and then installing or operatively placing the one or more batteries within the interior compartment 105 defined within the housing 102. Thus, the user may access the interior compartment 105 of the device 100 when mounted or secured at a difficult to remove location, for example, when the attachment strap 114 is utilized to secure the device 100 in the lateral space defined between the first and second plurality of spokes of the bicycle by wrapping the attachment strap 114 around the spoke crossing of the first plurality of spokes and the corresponding spoke crossing of the second plurality of spokes. Not only will this design provide a quick and efficient means of installing and/or replacing batteries or otherwise accessing the interior compartment 105 of the housing 102, but such design will make it unnecessary for the user to remove the housing 102 from the object to which it was installed when seeking to access the interior compartment 105 of the housing 102 which would otherwise be an undesirable and time consuming activity.

The device 100 may also include an attachment bracket 120 releasably connected to the housing 102. The attachment bracket 120 (as shown in FIGS. 9-13) may connect to the housing 102 with a friction or interference fit. In other embodiments, the attachment bracket 120 may engage protrusions 118 (as show in FIGS. 5 and 6) on the bottom portion 106 of the housing 102. The protrusions 118 may snap into corresponding openings or recesses within the mounting bracket 120. The attachment bracket 120 may be removed from the housing 102 and secured to a structure, such as by screwing or gluing the attachment bracket 120 to the structure. The housing 102 may then be connected to the secured attachment bracket 120 allowing the device 100 to be mounted to the structure for use. In the illustrated example, the attachment bracket 120 is attachable to the second portion 106 of the housing 102; however, in other examples, the attachment bracket 120 may be attachable to the first portion 104 of the housing 102 or attachable to both the first and second portions 104, 106 of the housing 102. The attachment bracket 120 includes an interior side, on which the housing 102 may be releasably mounted, and an opposing object facing side that will abut the mounting surface of the object on which device 100 may be mounted. The opposing object facing side may have a geometry that corresponds with the geometry of the object's mounting surface.

Using the previously described attachment strap 114 and attachment bracket 120, the disclosed portable power device 100 is able to be used in a wide variety of applications significantly increasing the utility of the device 100. As described below, the device 100 is operable to power a lighting device 130, such as an LED light string containing a plurality of light sources.

Also described herein are various methods of attaching the device 100 to an object. FIGS. 14A-14D illustrate various exemplary methods of attaching the device 100 to a bicycle 140, according to various embodiments of the present disclosure. It will be appreciated that, while FIGS. 14A to 14D illustrate the device 100 being mounted on the bicycle 140, the device may be mounted on various other objects without departing from the present disclosure.

Figure 14B:
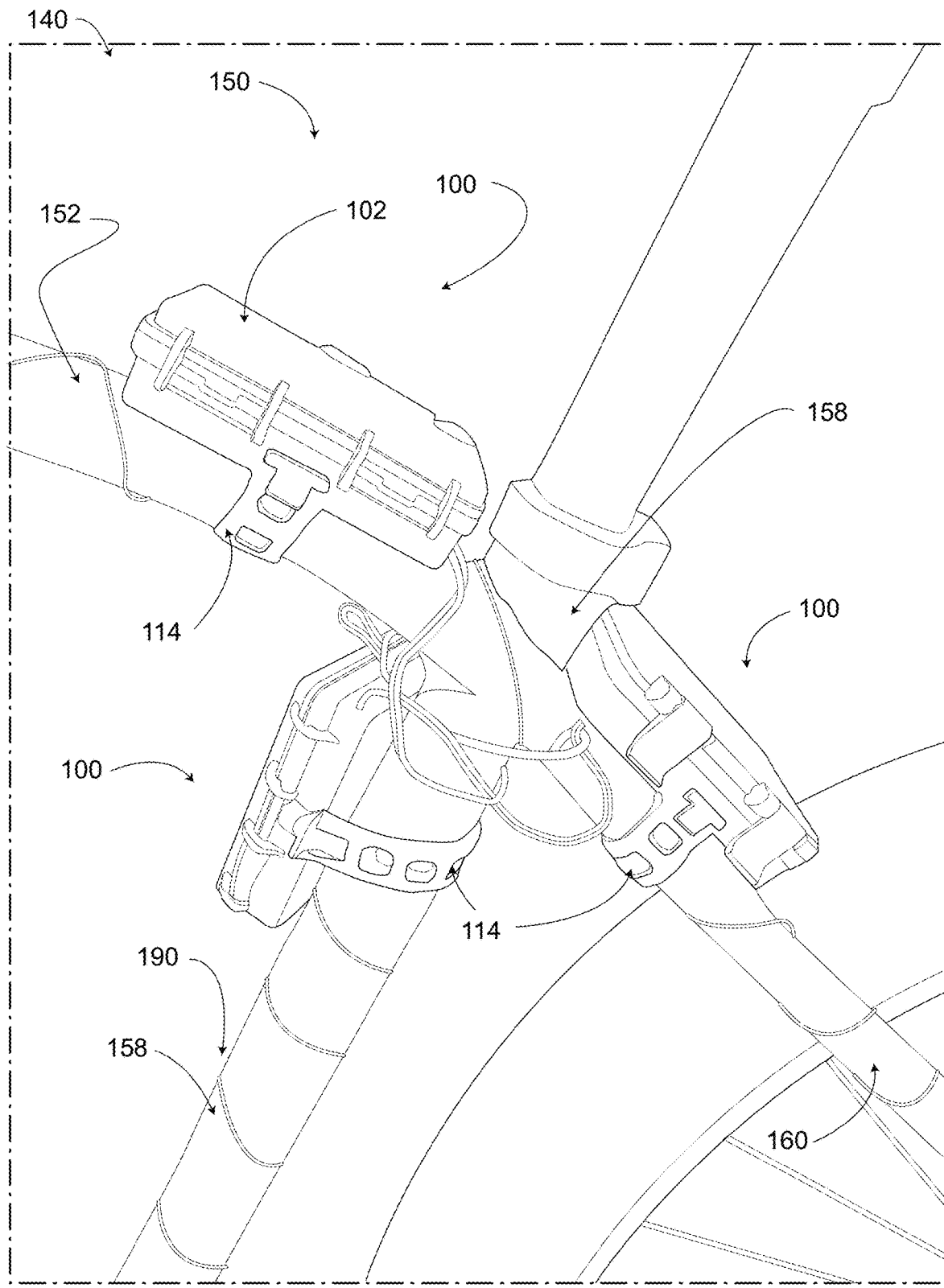

The device 100 is mounted to a frame 150 of the bicycle 140. FIG. 14A illustrates an example where the device 100 is mounted to a top tube 152 of the frame 150. Here, the device 100 is mounted to the bicycle 140 by wrapping the attachment strap 114 around the top tube 152 of the bicycle 140 frame 150. Also, FIG. 14A illustrates an example where the device 100 is mounted on a front portion of the top tube 152, proximate to a stem or head tube 154 of the frame 150. The device 100 may be mounted elsewhere on the frame 150, for example, on a down tube 156 of the frame 150. In other examples, however, the device may be mounted elsewhere on or about the frame 150. FIG. 14B illustrates an example where more than one device 100 is mounted on the frame 150 of the bicycle. As illustrated, the device 100 may be mounted on a rearward portion of the top tube 152, proximate to a seat tube 158 of the frame 150, by wrapping the attachment strap 114 around the rearward portion of the top tube 152 to thereby secure the device 100 thereto. FIG. 14B also illustrates an example where the device 100 is mounted on the seat tube 158 of the frame 150, for example, proximate to the top tube 152, by wrapping the attachment strap 114 around the seat tube 158 to thereby secure the device 100 thereto. In addition, FIG. 14B illustrates an example where the device 100 is mounted on a seat stay 160 of the frame 150, by wrapping the attachment strap 114 around the seat stay 160 to thereby secure the device 100 thereto. While FIG. 14B illustrates an example having three of the devices 100 mounted on the frame 140, more or less than three of the devices 100 may be mounted on any particular object such as the bicycle 140.

Figure 14D:
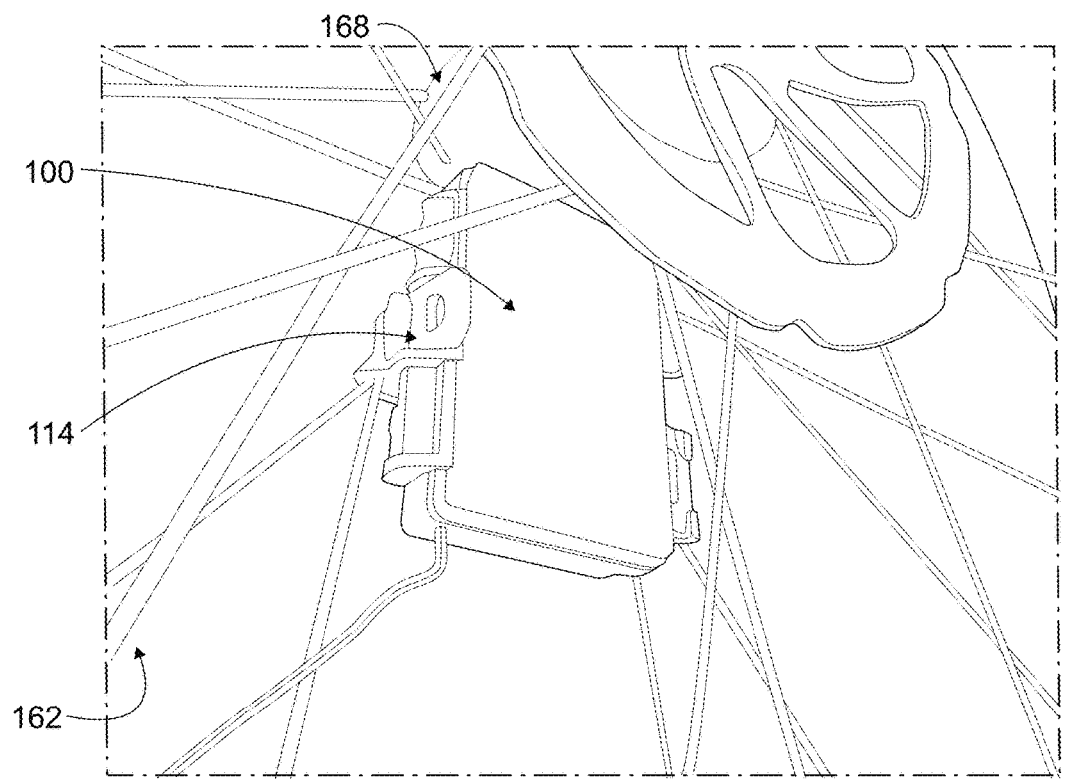
Figure 14C:
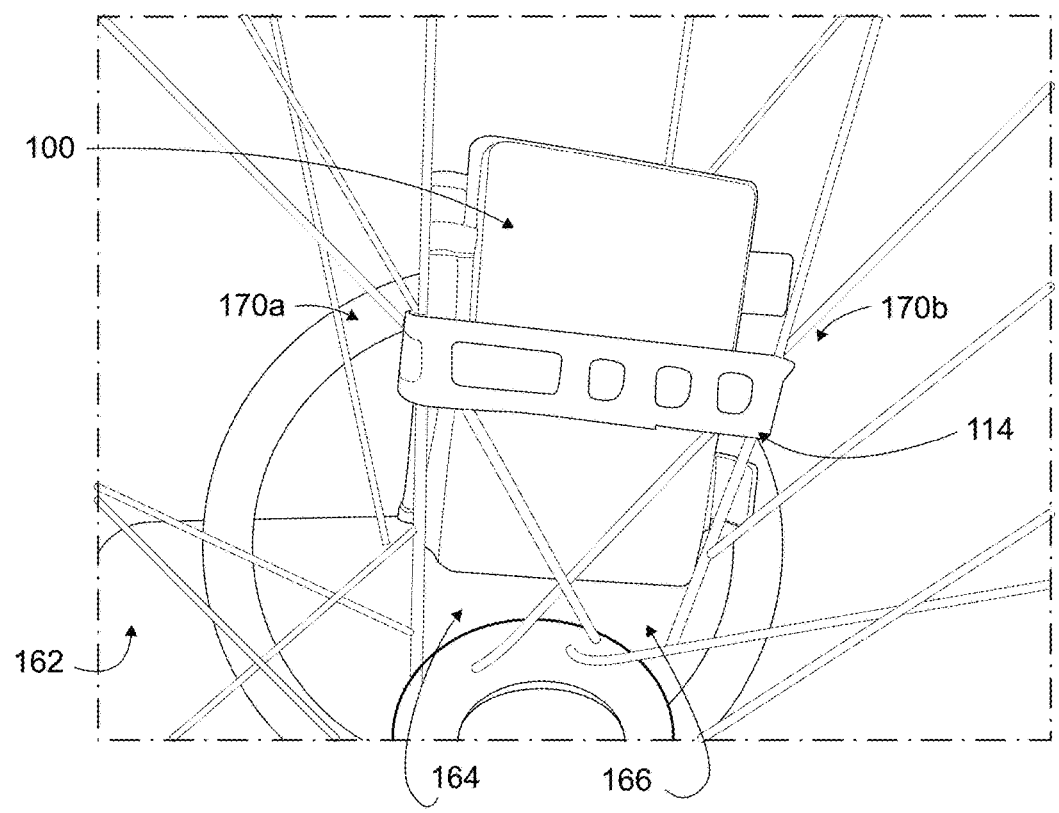

FIGS. 14C and 14D illustrate another example mounting of the device 100 according to one or more embodiments of the present disclosure. In particular, FIGS. 14C and 14D illustrate the device 100 mounted to spokes of a bicycle wheel 162 of the bicycle 140. The bicycle wheel 162 includes a hub 164, laterally extending between a first hub end and a second hub end, and further includes a first plurality of spokes 166 tangentially extending from the first end of the hub 164 towards a wheel rim (not illustrated) and a second plurality of spokes 168 tangentially extending from the second end of the hub 164 towards the rim of the bicycle wheel 162. FIG. 14C is a side view of the bicycle wheel 162 illustrating the first plurality of spokes 166 extending from the first end of the hub 164, whereas FIG. 14D is an opposite side view of the bicycle wheel 162 illustrating the second plurality of spokes 168 extending from the second end of the hub 164. The spokes of the first and second plurality of spokes 166, 168 radially extend towards the rim at different angles, such that two or more spokes of the first plurality of spokes 166 cross each other at a spoke crossing. Both the first and second plurality of spokes 166, 168 may have a plurality of spoke crossings. In the illustrated example, the device is mounted to the first plurality of spokes 166 by wrapping the attachment strap 114 around a pair of neighboring spoke crossings 170a, 170b of the first plurality of spokes 166 to thereby secure the device 100 thereto. In this manner, the device 100 is suspended within the bicycle wheel 162, in a space defined between the first and second plurality of spokes 166, 168. In other examples, the device 100 may also or instead by mounted to a pair of neighboring spoke crossings of the second plurality of spokes 168. In other examples, the device 100 may also or instead by secured to the bicycle wheel 162 by wrapping the attachment strap 114 around a spoke crossing of the first plurality of spokes 166 and a spoke crossing of the second plurality of spokes 168, to thereby suspend the device 100 within the space defined between the first and second plurality of spokes 166, 168.

The device 100 may be utilized to power various items, such as an LED light string 190 containing a plurality of light sources. The LED light string 190 may be installed on the bicycle 140 in a variety of manners, for example, by wrapping it around one or more portions of the frame 150 of the bicycle 140 and/or weaving or lacing it within the spokes of the bicycle wheel 162. Where utilized, the LED light string 190 may be installed on the frame 150 and/or the bicycle wheel 162 before mounting the device 100 to the bicycle 140. However, the LED light string 190 may be installed on the frame 150 and/or the bicycle wheel 162 after mounting the device 100 to the bicycle 140.

In some examples, the attachment strap 114 is utilized to secure the attachment bracket 120 to the frame 140 and/or the wheel 162 of the bicycle 140. In these examples, the attachment bracket 120 may be mounted to the bicycle 140 with or without the housing 102 of the device 100 provided within the attachment bracket 120. After installing the attachment bracket 120 to the bicycle 140, for example, as described above, the housing 102 of the device 100 may releasably attached to the attachment bracket 120 or removed from the attachment bracket 120, without having to remove the attachment bracket 120 from the bicycle 140.

Figure 15:
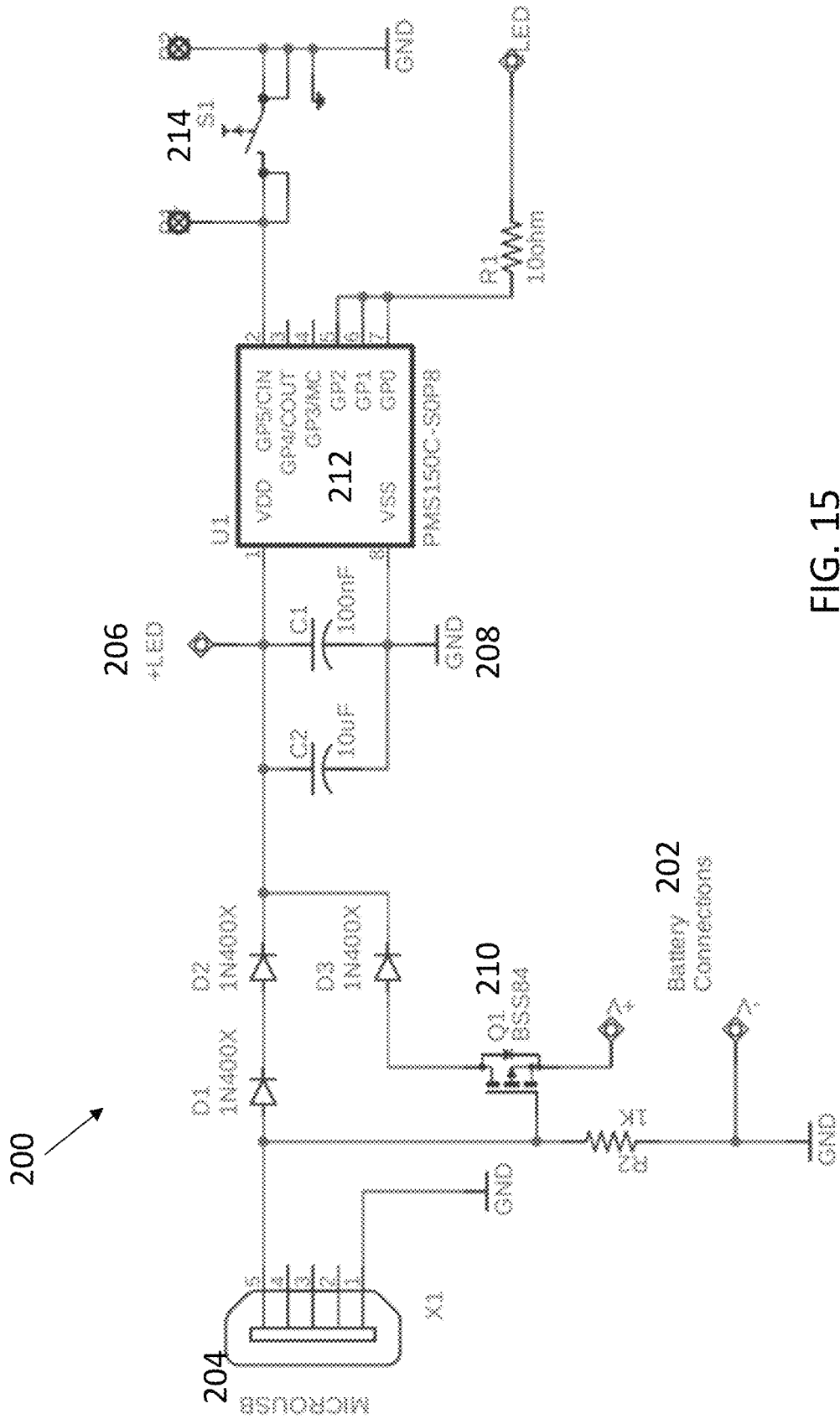
FIG. 15 is a schematic circuit diagram of an example embodiment of a portable power device according to the present disclosure.

Referring to FIG. 15, a schematic circuit diagram is illustrated that is utilizable with the portable power device 100, according to one or more embodiments. As illustrated, the circuit 200 includes an internal power supply connector 202, designated as Battery Connections. The internal power supply connector 202 provides positive and negative terminals for connecting one or more internal power supplies, such as batteries (not shown), in series or parallel as may be desirable depending on the application of the device 100. The circuit 200 also includes an external power supply connector 204, which may be a USB or micro USB port as illustrated. The external power supply connector 204 allows the use of an external power supply, as an alternative to the internal power supply. In this manner, the portable power device 100 may be operated with either the internal power supply, via the internal power supply connector 202, or the external power supply, via the external power supply connector 204, as desired.

The circuit 200 includes an output configured to receive power from either the internal power supply connector 202 or the external power supply connector 204. In an embodiment, the output includes a positive polarity output connector 206 and a negative polarity output connector 208. As illustrated, the output may be connected to an illumination device, such as an LED light string containing a plurality of light sources.

The circuit 200 includes a control circuit, which may comprise a single transistor 210 as shown in FIG. 15. In one embodiment, the control circuit is positioned between the internal power supply 202 connector and the output. The control circuit is configured to connect the internal power supply provided at the internal power supply connector 202 to the output when the external power supply connector 204 is not connected to an external power supply, and configured to disconnect the internal power supply from the output when the external power supply connector 204 is connected to an external power supply. For example, when an external power supply is not connected to the external power supply connector 204, the transistor 210 is placed in a conductive state connecting the positive terminal of the internal power supply connector 202 to the positive polarity output connector 206, through diode D3. When an external power supply is connected to the external power supply connector 204, the voltage of the external power supply is applied to the gate of the transistor 210 causing the transistor 210 to be placed in a non-conductive state. In this manner, the internal power supply is disconnected from the output. The external power supply is connected to the positive polarity output 206 through one or more diodes (D1, D2). The output is therefore powered by either the internal power supply or the external power supply, but not both. In addition, diode D3 inhibits back-charging of the internal power supply by the external power supply allowing the portable power device 100 to be used with standard non-rechargeable batteries. The control circuit responsive to the external power supply allows the portable power device 100 to conserve the internal power supply by automatically switching to the external power supply when it is available.

In some embodiments, the circuit 200 includes a microcontroller 212. The microcontroller 212 may be used to modulate the output in a manner appropriate for the application in which the portable power device 100 is used. As one example, the microcontroller 212 may be programmed to cause lights to alternate on and off, which may further reduce power consumption or may be used for aesthetic purposes.

In yet other embodiments, the circuit 200 may include a switch 214. The switch 214 may be used to verify that the housing 102 of the portable power device 100 is closed and latched prior to enabling power to the output of the device 100, and/or whether the device 100 is attached to an object via the attachment strap 114 and/or the attachment bracket 120.

In the specification and claims, reference will be made to a number of terms that have the following meanings. The singular forms "a," "an" and "the" include plural references unless the context clearly dictates otherwise. Approximating language, as used herein throughout the specification and claims, may be applied to modify any quantitative representation that could permissibly vary without resulting in a change in the basic function to which it is related. Moreover, unless specifically stated otherwise, any use of the terms "first," "second," "top," "bottom" etc., do not denote any order or importance, but rather the terms "first," "second," "top," "bottom" etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be." The term "instructions" as used herein may refer to computer executable instructions.

While principles and modes of operation have been explained and illustrated with regard to particular embodiments, it must be understood, however, that this may be practiced otherwise than as specifically explained and illustrated without departing from its spirit or scope.

What is claimed is:

1. A portable power device comprising:
  a housing configured to contain an internal power supply, the housing having a top portion connected to a bottom portion by at least one hinge,
  at least one clasp disposed on a side of the housing opposite the at least one hinge, the at least one clasp configured to maintain the housing in a closed position without the use of tools;
  an attachment bracket releasably connected to the housing by interference fit, wherein the attachment bracket is configured to be mounted to a surface such that the housing may be secured to the surface by the attachment bracket;
  at least one strap anchor configured as a T-shaped protrusion attached to the bottom portion of the housing; and
  an attachment strap releasably connected to the housing and attachable to the at least one strap anchor via an opening configured to receive the T-shaped protrusion to secure the housing to an object;
  wherein when the attachment strap is releasably secured to the object and attached to the at least one strap anchor, the top portion is operable to move about the at least one hinge such that the internal power supply may be accessible.

2. The portable power device of claim 1, wherein the at least one strap anchor includes a pair of strap anchors.

3. The portable power device of claim 2, wherein the pair of strap anchors are both provided on the bottom portion.

4. The portable power device of claim 1, wherein the at least one strap anchor is integral with the housing.

5. The portable power device of claim 1 further comprising:
  an internal power supply connector configured to receive power from the internal power supply within the housing;
  an output configured to receive power from the internal power supply;
  a control circuit between the internal power supply connector and the output.

6. The portable power device of claim 5, wherein the internal power supply connector is configured to connect to one or more batteries.

7. The portable power device of claim 5 further comprising an illumination device connected to the output, wherein the illumination device includes a plurality of light sources powered by the internal power supply.

8. The portable power device of claim 5 further comprising:
  an external power supply connector configured to receive power from an external power supply;
  the output configured to selectively receive power from the internal power supply or the external power supply;
  a control circuit between the external power supply connector and the output.

9. The portable power device of claim 8 further comprising an illumination device connected to the output, wherein the illumination device includes a plurality of light sources powered by the external power supply.

10. The portable power device of claim 8, wherein the external power supply connector is a USB or micro-USB port.

11. The portable power device of claim 1, further comprising a gasket disposed between the top portion and the bottom portion to inhibit moisture from entering the housing.

* * * * *